(12) United States Patent
Inagaki et al.

(10) Patent No.: US 7,873,688 B2
(45) Date of Patent: Jan. 18, 2011

(54) PROCESSING METHOD AND COMPUTER SYSTEM FOR SUMMATION OF FLOATING POINT DATA

(75) Inventors: Junichi Inagaki, Kawasaki (JP); Masao Koyabu, Kawasaki (JP); Hiroaki Ishihata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1094 days.

(21) Appl. No.: 11/475,048

(22) Filed: Jun. 27, 2006

(65) Prior Publication Data

US 2007/0226288 A1 Sep. 27, 2007

(30) Foreign Application Priority Data

Mar. 23, 2006 (JP) ............................. 2006-080535

(51) Int. Cl.
- *G06F 7/42* (2006.01)
- *G06F 7/38* (2006.01)
- *G06F 15/16* (2006.01)

(52) U.S. Cl. .................. 708/505; 708/495; 709/201

(58) Field of Classification Search .................. None
See application file for complete search history.

(56) References Cited

U.S. PATENT DOCUMENTS

| 4,054,787 | A | * | 10/1977 | Pos ............................. 708/510 |
| 5,117,384 | A | | 5/1992 | Drehmel et al. |
| 5,359,548 | A | * | 10/1994 | Yoshizawa et al. .......... 708/505 |
| 2002/0184285 | A1 | | 12/2002 | Pangal et al. ................. 708/505 |
| 2003/0154227 | A1 | | 8/2003 | Howard et al. |
| 2004/0073590 | A1 | * | 4/2004 | Bhanot et al. ................ 708/534 |
| 2004/0103218 | A1 | * | 5/2004 | Blumrich et al. ............ 709/249 |

FOREIGN PATENT DOCUMENTS

| JP | 02-085922 | 3/1990 |
| JP | 2005-506596 | 3/2005 |
| WO | 02/069177 | 9/2002 |

OTHER PUBLICATIONS

Author: Demmel et al.; Title: "Accurate floating point summation"; Date: May 8, 2002; URL: http://citeseerx.ist.psu.edu/viewdoc/summary?doi=10.1.1.3.2079.*

Author: Almási et al.; Title: "Optimization of MPI collective communication on BlueGene/L systems"; Date: Jun. 22, 2005; URL: http://portal.acm.org/citation.cfm?id=1088149.1088183.*

Author: Wikipedia; Title: "Multi-core processor"; Date: Feb. 20, 2006; URL: http://en.wikipedia.org/w/index.php?title=Multi-core_processor&oldid=40440761.*

Chinese Office Action issued on Jun. 19, 2009 in corresponding Chinese Patent Application 200610107805.1.

Extended European Search Repot issued Sep. 1, 2008 in corresponding European Patent Application No. 06253422.7.

* cited by examiner

*Primary Examiner*—Lewis A Bullock, Jr.
*Assistant Examiner*—Joseph Kelly
(74) *Attorney, Agent, or Firm*—Staas & Halsey LLP

(57) ABSTRACT

A computer system execute summation processing even if the computing sequence is not adhered to in a system for computing a sum of floating point data of a plurality of nodes. Each node sends floating point data to a reduction mechanism, and the reduction mechanism computes the sums only for a group of which exponent sections have a highest value and a group of which exponent sections have a second highest value, and adds the sum of the group of which the exponent sections have a highest value and the sum of the group of which the exponent sections have a second highest value. By this, the consistency of the computation result can be guaranteed even if the sum is computed regardless the computing sequence of the values.

10 Claims, 10 Drawing Sheets

| DESTINATION ADDRESS | TRANSMISSION SOURCE ADDRESS | FRAME TYPE | DATA | FRAME CHECKSUM |
|---|---|---|---|---|

FIG. 7

DOUBLE PRECISION FLOATING POINT

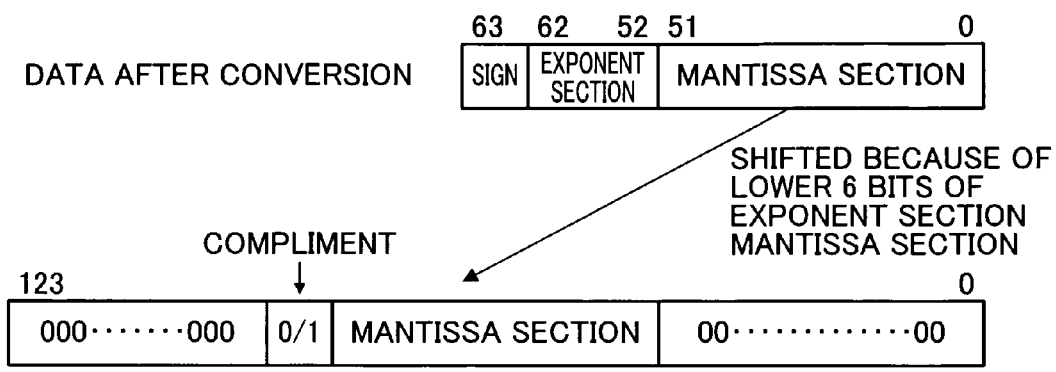

FIG. 8

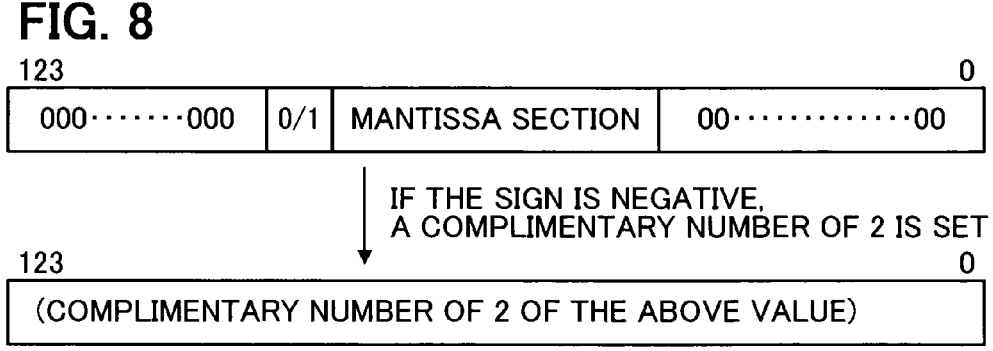

FIG. 9

| COMPARISON RESULT OF EXPONENT 1 AND EXPONENT 3 | REGISTER 22-5 NEW EXPONENT 3 | REGISTER 22-5 NEW MANTISSA 3 | REGISTER 22-8 NEW MANTISSA 4 |
|---|---|---|---|
| EXPONENT 1 > EXPONENT 3 + 1 | EXPONENT 1 | MANTISSA 1 | "0" |
| EXPONENT 1 = EXPONENT 3 + 1 | EXPONENT 1 | MANTISSA 1 | MANTISSA 3 |
| EXPONENT 1 = EXPONENT 3 | EXPONENT 3 | MANTISSA 1 + MANTISSA 3 | MANTISSA 4 |
| EXPONENT 1 + 1 = EXPONENT 3 | EXPONENT 3 | MANTISSA 3 | MANTISSA 1 + MANTISSA 4 |
| EXPONENT 1 + 1 < EXPONENT 3 | EXPONENT 3 | MANTISSA 3 | MANTISSA 4 |

FIG. 13

DATA 1 "44C8 0018 0000 0000"
    BEFORE CONVERSION  EXPONENT = "44C"  MANTISSA = "8 0018 0000 0000"  SIGN = "+"
    DURING PROCESS 1     EXPONENT = "44C"  MANTISSA = "000 0000 0000 0000 0018 0018 0000 0000"
    AFTER CONVERSION   EXPONENT = "11"   MANTISSA = "000 0000 0000 0001 8001 8000 0000 0000"

DATA 2 "C4C8 0000 0000 0000"
    BEFORE CONVERSION  EXPONENT = "44C"  MANTISSA = "8 0000 0000 0000"  SIGN = "-"
    DURING PROCESS 1     EXPONENT = "44C"  MANTISSA = "000 0000 0000 0000 0018 0000 0000 0000"
    DURING PROCESS 2     EXPONENT = "11"   MANTISSA = "000 0000 0000 0001 8000 0000 0000 0000"
    AFTER CONVERSION   EXPONENT = "11"   MANTISSA = "FFF FFFF FFFF FFFE 8000 0000 0000 0000"

DATA 3 "43C4 0000 0000 0008"
    BEFORE CONVERSION  EXPONENT = "43C"  MANTISSA = "4 0000 0000 0008"  SIGN = "+"
    AFTER CONVERSION   EXPONENT = "10"   MANTISSA = "001 4000 0000 0000 8000 0000 0000 0000"

DATA 4 "43C2 0000 0000 0008"
    BEFORE CONVERSION  EXPONENT = "43C"  MANTISSA = "2 0000 0000 0008"  SIGN = "+"
    AFTER CONVERSION   EXPONENT = "10"   MANTISSA = "001 2000 0000 0000 8000 0000 0000 0000"

FIG. 14

COMPUTATION RESULT (MANTISSA 3)
        EXPONENT = "11"  MANTISSA 3 = "000 0000 0000 0000 0001 8000 0000 0000"

COMPUTATION RESULT (MANTISSA 4)
    BEFORE SHIFT  EXPONENT = "10"  MANTISSA 4 = "002 6000 0000 0001 0000 0000 0000 0000"
    AFTER SHIFT   EXPONENT = "11"  MANTISSA 4 = "000 0000 0000 0000 0002 6000 0000 0001"

FINAL COMPUTATION RESULT
        EXPONENT = "11"  MANTISSA = "000 0000 0000 0000 0003 E000 0000 0001"

FIG. 15

DATA CONVERSION
    BEFORE CONVERSION  EXPONENT = "11"   MANTISSA = "000 0000 0000 0000 0003 E000 0000 0001"
    DURING PROCESS 1     EXPONENT = "440"  MANTISSA = "000 0000 0000 0000 0003 E000 0000 0001"
    DURING PROCESS 2     EXPONENT = "43D"  MANTISSA = "1F 0000 0000 0008"  SIGN = "+"
    DURING PROCESS 3     EXPONENT = "43D"  MANTISSA = "F 0000 0000 0008"  SIGN = "+"
    AFTER CONVERSION   RESULT OF CONVERSION TO DOUBLE PRECISION FLOATING POINT FORMAT
                       = "43DF 0000 0000 0008"

FIG. 18

| COMPARISON RESULT OF EXPONENT 1 AND EXPONENT 3 | NEW EXPONENT 3 | NEW MANTISSA 3 | NEW MANTISSA 4 |
|---|---|---|---|
| EXPONENT 1 > EXPONENT 3 + 1 | EXPONENT 1 | MANTISSA 1 | MANTISSA 2 |
| EXPONENT 1 = EXPONENT 3 + 1 | EXPONENT 1 | MANTISSA 1 | MANTISSA 2 + MANTISSA 3 |
| EXPONENT 1 = EXPONENT 3 | EXPONENT 3 | MANTISSA 1 + MANTISSA 3 | MANTISSA 2 + MANTISSA 4 |
| EXPONENT 1 + 1 = EXPONENT 3 | EXPONENT 3 | MANTISSA 3 | MANTISSA 1 + MANTISSA 4 |
| EXPONENT 1 + 1 < EXPONENT 3 | EXPONENT 3 | MANTISSA 3 | MANTISSA 4 |

FIG. 19  PRIOR ART
SINGLE PRECISION FLOATING POINT
DOUBLE PRECISION FLOATING POINT
FIG. 20  PRIOR ART
| | EXPONENT MANTISSA | | |
|---|---|---|---|
| DATA 1 | "44C8 0018 0000 0000" | | |
| DATA 2 | "C4C8 0000 0000 0000" | RESULT 1 (DATA 1 + DATA 2) | "43C8 0000 0000 0000" |
| DATA 3 | "43C4 0000 0000 0008" | RESULT 2 (RESULT 1 + DATA 3) | "43D6 0000 0000 0004" |
| DATA 4 | "43C2 0000 0000 0008" | RESULT 3 (RESULT 2 + DATA 4) | "43DF 0000 0000 0008" |
FIG. 21  PRIOR ART
| | EXPONENT MANTISSA | | |
|---|---|---|---|
| DATA 1 | "44C8 0018 0000 0000" | | |
| DATA 3 | "43C4 0000 0000 0008" | RESULT 1 (DATA 1 + DATA 3) | "44C8 002C 0000 0000" |
| DATA 4 | "43C2 0000 0000 0008" | RESULT 2 (RESULT 1 + DATA 4) | "44C8 003E 0000 0000" |
| DATA 2 | "C4C8 0000 0000 0000" | RESULT 3 (RESULT 2 + DATA 2) | "43DF 0000 0000 0000" |

FIG. 22    PRIOR ART

(NODE OPERATION)

[DETECTS EXPONENT SECTION AND INSTRUCTS REDUCTION MECHANISM TO COMPARE SIZE OF EXPONENT SECTIONS]

↓

(OPERATION OF REDUCTION MECHANISM)

[COMPARES EXPONENT SECTIONS OF ALL THE NODES AND RETURNS THE EXPONENT SECTION HAVING THE HIGHEST VALUE TO ALL THE NODES]

↓

[EXECUTES DIGIT MATCHING OF MANTISSA SECTION ACCORDING TO THE EXPONENT SECTION HAVING THE HIGHEST VALUE, AND INSTRUCTS THE REDUCTION MECHANISM TO ADD THE MANTISSA SECTIONS]

↓

[ADDS THE MANTISSA SECTIONS OF ALL THE NODES AND RETURNS THE RESULT TO ALL THE NODES]

↓

[CREATES NORMALIZED FLOATING POINT DATA FROM THE EXPONENT SECTION HAVING THE HIGHEST VALUE AND ADDED MANTISSA SECTIONS]

PROCESSING METHOD AND COMPUTER SYSTEM FOR SUMMATION OF FLOATING POINT DATA

CROSS-REFERENCE TO RELATED APPLICATIONS

This application is based upon and claims the benefit of priority from the prior Japanese Patent Application No. 2006-80535, filed on Mar. 23, 2006, the entire contents of which are incorporated herein by reference.

BACKGROUND OF THE INVENTION

1. Field of the Invention

The present invention relates to a processing method and computer system for summation of floating point data for computing the sum of floating point data, and more particularly to a processing method and computer system for summation of floating point data for computing the sum of floating point data of a plurality of computer nodes.

2. Description of the Related Art

A parallel computer system where a plurality of nodes including computers are installed and connected by a network has been provided. In such a parallel computer, one job is computed by a plurality of nodes in parallel, and the processing data is exchanged via a network. This parallel computer is comprised of several hundred to several thousand nodes if the scale becomes big.

In such a parallel computer, data of a plurality of nodes are collected, and a specified operation is executed. This is called "reduction processing". Examples of the reduction processing are an operation to determine the sum of the data of all nodes, and an operation to determine a maximum value or minimum value of the data of all nodes.

A floating point format, in which a numeric value is represented by an exponent and a mantissa, which is one data format handled by a computer, can represent numeric values in a wider range than representation by a fixed point format, in which the position of the decimal point is at a predetermined place. FIG. 19 depicts a floating point format and shows an IEEE standard floating point format.

FIG. 19 shows a 32-bit single precision floating point data and 64-bit double precision floating point data. In both cases the data is comprised of a sign bit, an exponent section and a mantissa section. The sign bit designates a sign of the numeric value, where "1" shows a negative number and "0" shows a positive number. The exponent section indicates an integer value that is of a power of 2, and a mantissa section indicates a value of 1.0 or more and less than 2.0 (normalized number). And the result of the exponent representation multiplied by the mantissa designates an actual numeric value.

In this summation of floating point data, if 3 or more of floating point data is added, the numeric value in the computing result differs depending on the sequence of adding the 3 data. FIG. 20 and FIG. 21 show the summation. Here the values of double precision floating point data are shown in hexadecimal.

As FIG. 20 shows, if floating point data 1, 2, 3 and 4, which consist of an exponent section and a mantissa section, are added in the sequence of data 1, 2, 3 and 4, data 1 and data 2 are added, and this addition result 1 and data 3 are added, then this addition result 2 and data 4 are added.

As FIG. 21 shows, if data is added in the sequence of data 1, 3, 4, and 2, data 1 and data 3 are added, and this addition result 1 and data 4 are added, then this addition result 2 and data 2 are added.

As the numeric examples in FIG. 20 and FIG. 21 show, the addition results of the 4 data differ. This is because the computing result is normalized each time, and canceling of digits is generated in the mantissa section.

In a parallel computer, where one job is executed by a plurality of computers in parallel, the result of parallel execution in progress and the final result may be collected, and the sum thereof may be determined. If the data format in such a case is floating point format, the computing result may be different depending on the computing sequence, which affects the accuracy of parallel computation. Therefore a method for guaranteeing the consistency of the computation result, even if the computing sequence is not adhered to, has been proposed.

FIG. 22 depicts the conventional summation of floating point data, and shows a method for guaranteeing the consistency of a computing result even if the computing sequence is not adhered to.

As FIG. 22 shows, it is effective, in terms of processing efficiency, to install the reduction mechanism, for performing summation of the floating point data of a plurality of nodes, separately from each node. First each node acquires only the exponent section of the floating point data, and instructs the reduction mechanism to determine the maximum value of the exponent section.

The reduction mechanism compares the exponent section data sent from each node, holds only the exponent section having the maximum value, and when the comparison of exponent section data from all the nodes is over, the reduction mechanism returns the exponent section having the highest value to all the nodes.

Each node executes digit matching of the mantissa section according to the exponent section having the highest value returned from the reduction mechanism. And each node instructs the reduction mechanism to determine the sum of the digit-matched mantissa section data.

The reduction mechanism adds the mantissa section data sent from each node, and when the addition of the mantissa section data from all the nodes completes, the reduction mechanism returns the result to all the nodes.

Each node creates the normalized floating point data from the sum of the exponent section data having the highest value and the mantissa section data.

In this way, according to the prior art, digit matching of the mantissa section data is executed by each node, according to the highest value of the exponent section, and the digit-matched data is sent to the reduction mechanism, so the sum can be computed without concern for the computing sequence of the summation (e.g. Japanese Patent Application Laid-Open No. 2005-506596).

In the case of the prior art, however, when a sum of a floating point data is determined, twice the operation, that is, a comparison of the size of exponent sections and the addition of the mantissa sections, are required. Therefore a data exchange between each node and the reduction mechanism is also required twice, which makes the reduction processing time longer. Particularly if the number of nodes increases to several hundred or to several thousand, this increase in the processing time causes interference in increasing the speed of parallel processing.

Also in order to adhere to the computing sequence, a storage circuit for storing the data of all the nodes may be installed in the reduction mechanism, so that the data of all the nodes are received first, then addition is sequentially executed. However an increase in the number of nodes increases the scale of the storage circuit, which increases cost.

And starting computation after receiving the data of all the nodes increases processing time. If the number of nodes is increased to several hundred or to several thousand, the circuit scale becomes large, and the length of processing time becomes conspicuous.

SUMMARY OF THE INVENTION

It is an object of the present invention to provide a processing method and a computer system for the summation of floating point data, for increasing the speed of the summation of the floating point data of many nodes.

It is another object of the present invention to provide a processing method and a computer system for the summation of floating point data, which increases the speed of the summation of the floating point data of many nodes without requiring adhering to a computing sequence, and is therefore effective for parallel processing.

It is still another object of the present invention to provide a processing method and a computer system for the summation of floating point data for increasing the speed of the summation of the floating point data of many nodes without installing an unnecessary storage circuit.

To achieve the above objects, the present invention is a summation processing method for floating point data for computing a sum of three or more floating point data, having the steps of: computing a sum of the mantissa sections of a group of which exponent sections have a highest value among a plurality of groups grouped by the size of the exponent section of the floating point data, and a sum of the mantissa sections of a group of which the exponent sections have a second highest value; and adding the sum of the mantissa sections of the group of which the exponent sections have the highest value and the sum of the mantissa sections of the group of which the exponent sections have a second highest value.

A computer system of the present invention has a plurality of nodes and a reduction mechanism for computing a sum of floating point data of each of the nodes. The reduction mechanism computes a sum of mantissa sections of a group of which exponent sections have a highest value among a plurality of groups grouped by the size of the exponent section of the floating point data, and a sum of the mantissa sections of a group of which the exponent sections have a second highest value, and adds the sum of mantissa sections of the group of which exponent sections have the highest value and the sum of the mantissa sections of the group of which exponent sections have the second highest value.

Another computer system of the present invention has a plurality of nodes and a reduction mechanism for computing a sum of floating point data of each of the nodes. And each of the nodes computes a sum of mantissa sections of a group of which exponent sections have a highest value among a plurality of groups grouped by the size of the exponent section of the floating point data, and a sum of mantissa sections of the group of which exponent sections have a second highest value, and sends the computation result to the reduction mechanism. And the reduction mechanism computes the sum of the mantissa sections of a group of which exponent sections have the highest value and the sum of the mantissa sections of a group of which exponent sections have the second highest value for a plurality of nodes, and returns the computation result to each node, and each of the nodes adds the sum of the mantissa sections of the group of which exponent sections have the highest value, and the sum of the mantissa sections of the group of which exponent sections have the second highest value, returned from the reduction mechanism.

In the present invention, it is preferable that the computing step further has a step of comparing the significant bits of the exponent sections and computing the sum of the mantissa sections of the group of which exponent sections have a highest value and the sum of the mantissa sections of the group of which exponent sections have a second highest value according to the comparison result.

In the present invention, it is preferable that the computing step further has the steps of: shifting the mantissa section according to the values of the insignificant bits of the exponent section so as to create a mantissa section with an expanded data width; and computing the sum of the mantissa sections of the group of which exponent sections have the highest value and the sum of the mantissa sections of the group of which exponent sections have the second highest value using the mantissa section with an expanded data width.

Also in the present invention, it is preferable that the addition step further has the steps of: matching the digits of the summation result of the mantissa sections of the group of which exponent sections have the second highest value, and the summation result of the mantissa sections of the group of which exponent sections have the highest value; and adding the summation result of the group of which exponent sections have the highest value and the summation result of the mantissa sections of the group of which digit-matched exponent sections have the second highest value.

It is also preferable that the present invention further has a step of creating the floating point data from the addition result of the mantissa sections and significant bits of the exponent section.

In the present invention, the computing result of a group of which the exponent value is smaller by a value of 2 or more does not influence the computation result of a group of which the exponent sections have the highest value. So by computing the sum only for a group of which exponent values have the highest value and a group of which exponent sections have the second highest value, and adding the sum of the group of which exponent sections have the highest value and the sum of the group of which exponent sections have the second highest value, the consistency of the computation result can be guaranteed even if computation is executed regardless the computing sequence of the numeric values.

BRIEF DESCRIPTION OF THE DRAWINGS

FIG. 7 is a diagram depicting the data conversion processing in FIG. 6;

FIG. 8 is a diagram depicting the complementary data creation processing in FIG. 7;

FIG. 9 shows the relationship of the comparison result and computing processing in FIG. 5;

FIG. 13 shows an example of the data conversion processing in FIG. 6;

FIG. 14 shows an example of the summation processing in FIG. 6;

FIG. 15 shows an example of the conversion processing into the floating point data in FIG. 6;

FIG. 18 shows the comparison result and computing processing in FIG. 17;

FIG. 19 shows the formats of floating point data;

FIG. 20 shows conventional summation processing of floating point data;

FIG. 21 shows conventional summation processing of floating point data where the computing sequence in FIG. 20 is changed; and FIG. 22 shows the summation processing of floating point data which does not have to adhere to a conventional computing sequence.

DESCRIPTION OF THE PREFERRED EMBODIMENTS

Embodiments of the present invention will now be described in the sequence of configuration of computer system, configuration of reduction mechanism, first embodiment, second embodiment and other embodiments, but the present invention is not limited to these embodiments.

Configuration of Computer System

Figure 1:
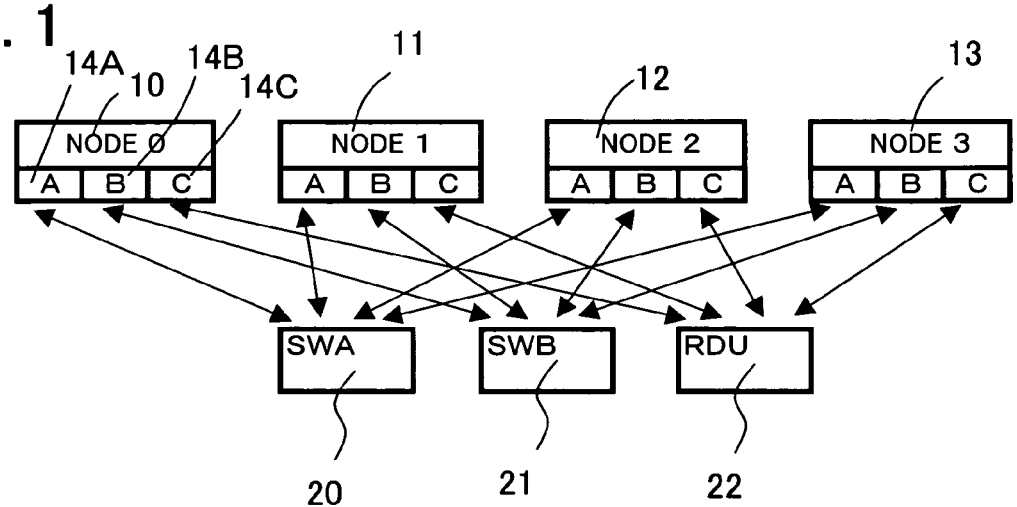
FIG. 1 is a block diagram depicting the computer system according to an embodiment of the present invention.
Figure 2:
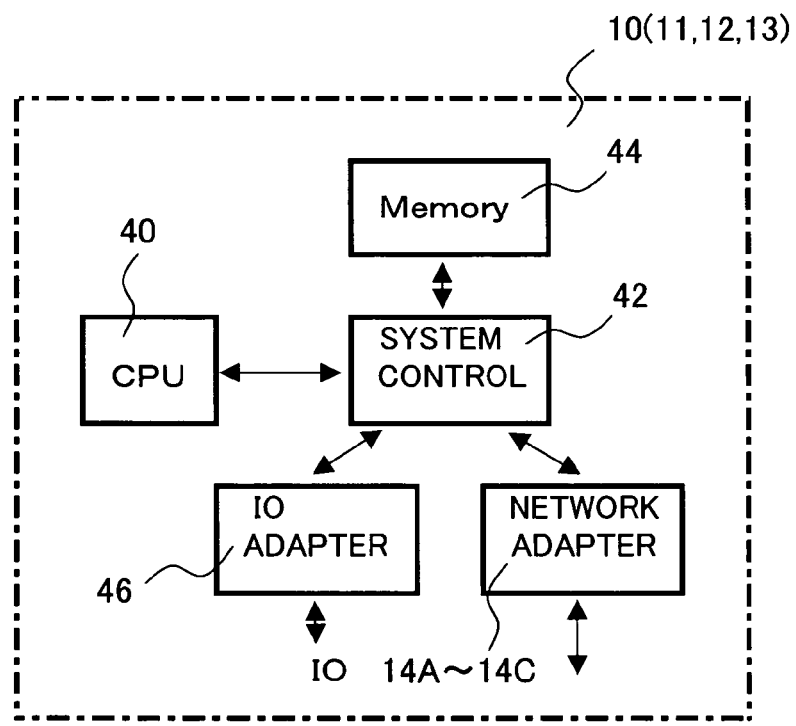
FIG. 2 is a block diagram depicting the node in FIG. 1.
Figures 3, 4:
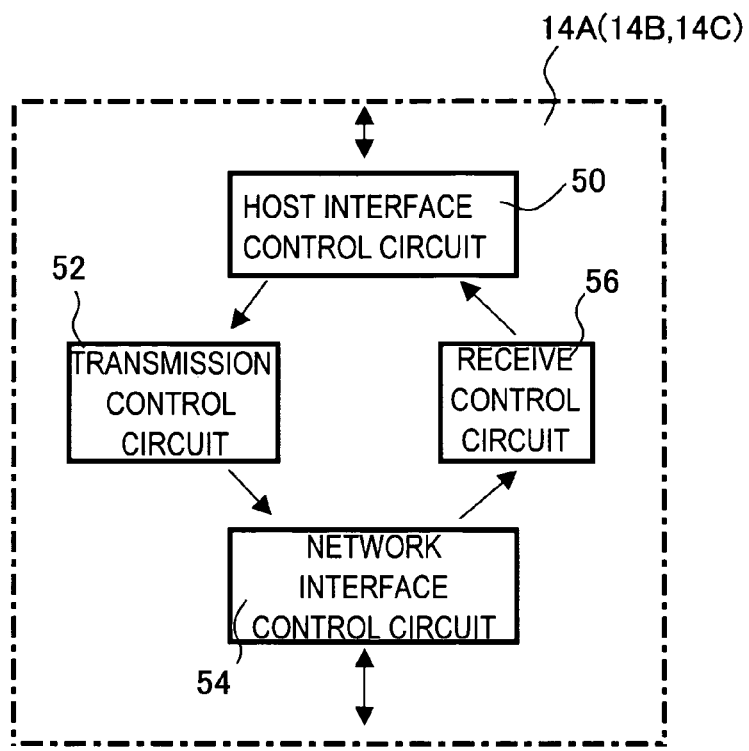
FIG. 3 is a block diagram depicting the network adapter in FIG. 1 and FIG. 2.
FIG. 4 shows a format of the transmission frame in FIG. 1.

FIG. 1 is a block diagram depicting an embodiment of the computer system of the present invention, FIG. 2 is a block diagram depicting the node in FIG. 1, FIG. 3 is a block diagram depicting the network adapter in FIG. 1, and FIG. 4 is the frame format of the transfer data in FIG. 1.

FIG. 1 shows a parallel computer as a computer system. As FIG. 1 shows, the parallel computer has a plurality (4 in this case) of nodes 10, 11, 12 and 13, two crossbar switches (SWA and SWB in FIGS. 1) 20 and 21, and a reduction mechanism 22. Each node 10, 11, 12 and 13 has 3 network adapters (A, B and C in FIG. 1) 14A, 14B and 14C. The network adapters 14A and 14B of each node 10, 11, 12 and 13 communicate with each other via the crossbar switches 20 and 21 respectively. The network adapter 14C of each node 10, 11, 12 and 13 communicates with the reduction mechanism 22. In other words, each of the network adapters 14A, 14B and 14C of each node 10, 11, 12 and 13 is connected to the crossbar switches 20 and 21 and the reduction mechanism 22 by the transmission line via the interface, such as ETHERNET®.

As FIG. 2 shows, this node 10 (11, 12, 13) is a computer wherein a CPU 40, a memory 44, an IO adapter 46 and the above mentioned network adapters 14A to 14C are connected via a system controller 42. A plurality of CPUs 40, memories 44 and IO adapters 46 may be installed according to the processing capability required for the node.

As FIG. 3 shows, the network adapter 14A (14B, 14C) in FIG. 1 and FIG. 2 is comprised of a host interface control circuit 50 which is connected to the system controller 42, a transmission control circuit 52, a network interface control circuit 54 which is connected to the transmission line, and a receive control circuit 56. The network adapter 14A (14B, 14C) is in-charge of data communication between the nodes and with the reduction mechanism 22.

To transfer data via the network adapter 14A (14B, 14C), the frame format shown in FIG. 4 is used for communication. The frame format in FIG. 4 shows a frame format used for ETHERNET®, and is comprised of a destination address, transmission source address, frame type (e.g. command type, data size), data, and frame checksum (e.g. CRC (Cyclic Redundancy Code)). The data length (data size) of the data area is variable, and the transfer data is divided into a plurality of frames and transferred if necessary.

Configuration of Reduction Mechanism

Figure 5:
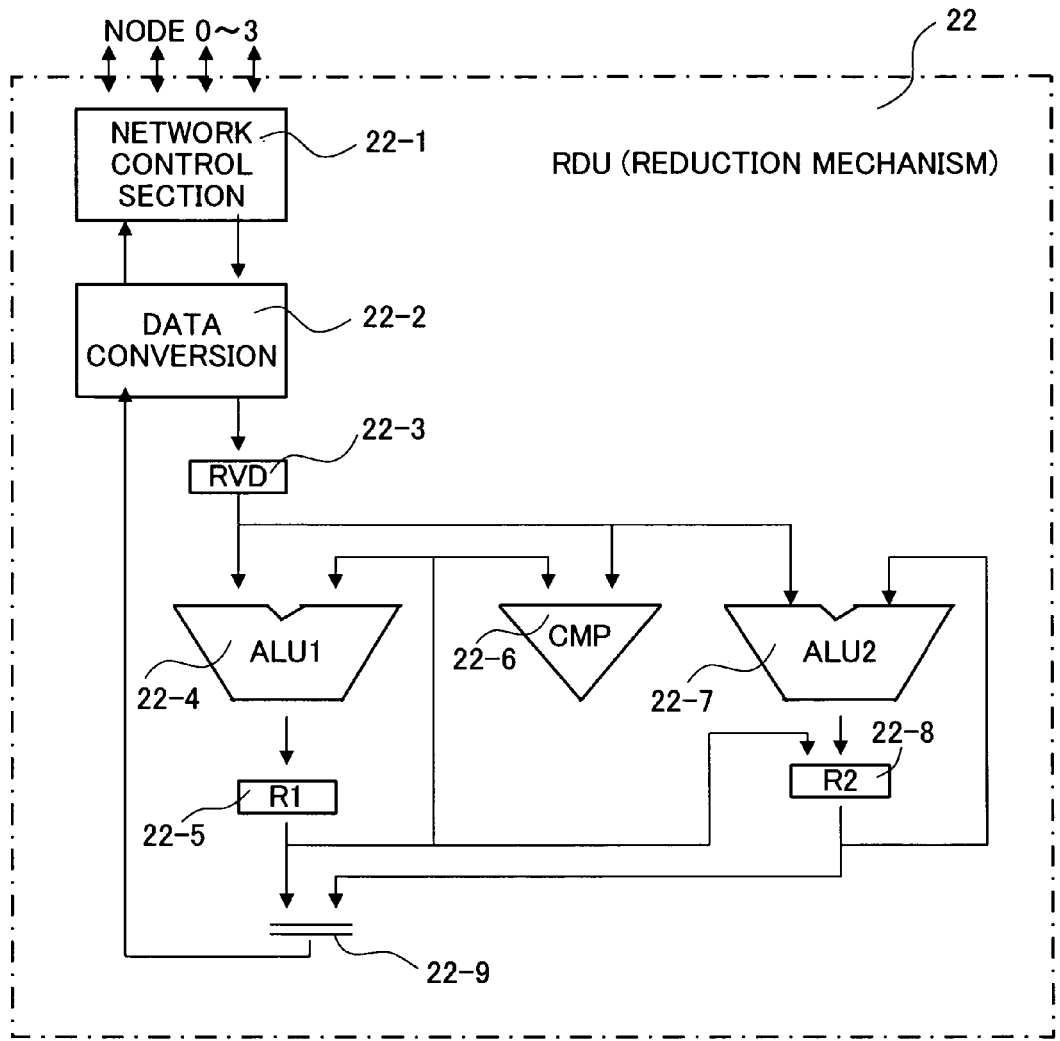
FIG. 5 is a block diagram depicting the reduction mechanism in FIG. 1.

FIG. 5 is a block diagram depicting the reduction mechanism in FIG. 1. As FIG. 5 shows, the major section of the reduction mechanism 22 is comprised of a network control section 22-1 for controlling transmission to/reception from each node, a data conversion section 22-2 for converting the later mentioned floating point data from each node into a predetermined data format, and converting the computing result into floating point data, a register 22-3 for holding the receive data after data conversion, arithmetic circuits (ALU1, ALU2) 22-4 and 22-7 for executing various operations for reduction, registers (R1, R2) 22-5 and 22-8 for holding the computing result, a comparison circuit (CMP) 22-6 for comparing data, and a multiplexer 22-9 for selecting the registers 22-5 and 22-8.

The receive data converted by the data conversion section 22-2 is held by the first register 22-3, and is input to the first arithmetic circuit 22-4, second arithmetic circuit 22-7 and comparison circuit 22-6. The comparison circuit 22-6 compares the significant bits of the exponent sections as described later. The computation result of the first arithmetic circuit 22-4 is held by the second register 22-5, and is input to the first arithmetic circuit 22-4, comparison circuit 22-6 and third register 22-8.

The data held by the third register 22-8 is input to the second arithmetic circuit 22-7. According to the comparison result of the comparison circuit 22-6, the first and second arithmetic circuits 22-4 and 22-7 perform addition. The second register 22-5 holds the computing result of the mantissa sections corresponding to a group of which the exponent sections have a highest value, and the third register 22-8 holds the computing result of the mantissa sections corresponding to a group of which the exponent sections have a second highest value.

In this embodiment, the data conversion section 22-2, arithmetic circuit 22-7, register 22-8 and multiplexer 22-9 are added to the configuration of the conventional reduction mechanism.

First Embodiment of Floating Point Summation Process

Figure 6:
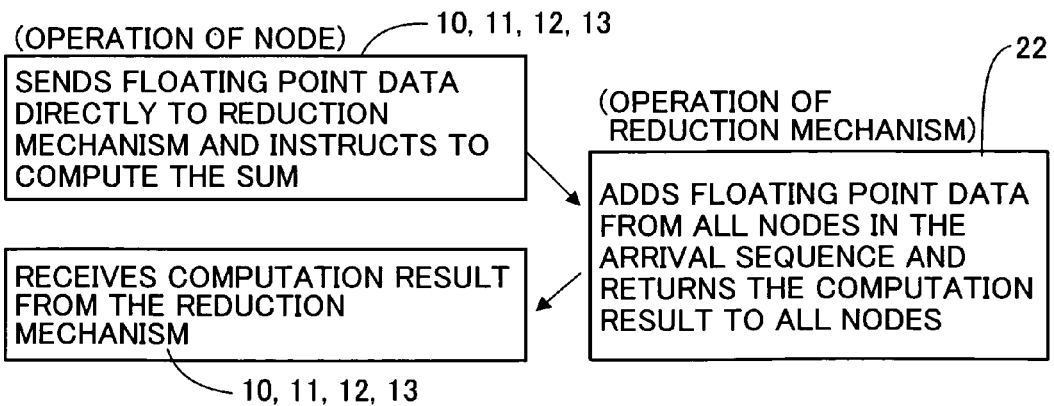
FIG. 6 is a diagram depicting the summation processing of the floating point data according to the first embodiment of the present invention.
Figure 10:
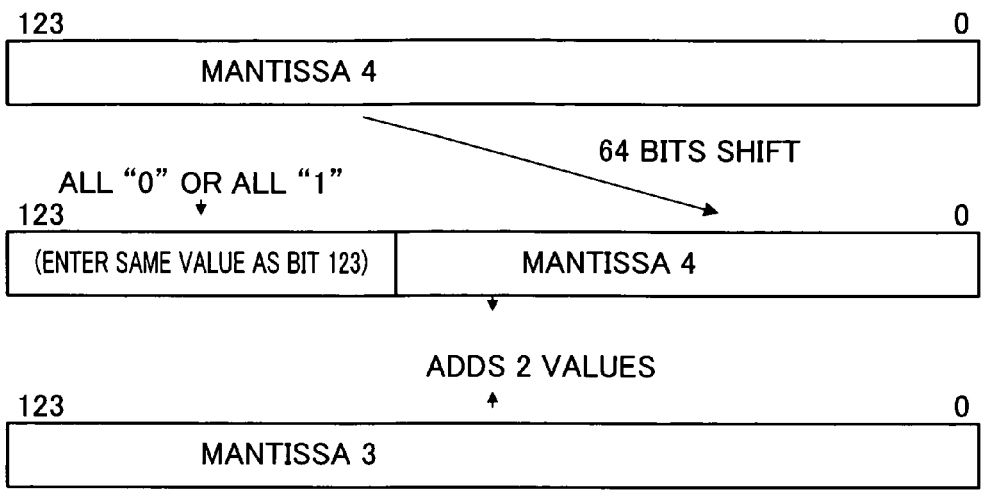
FIG. 10 is a diagram depicting the summation processing in FIG. 6.
Figure 11:
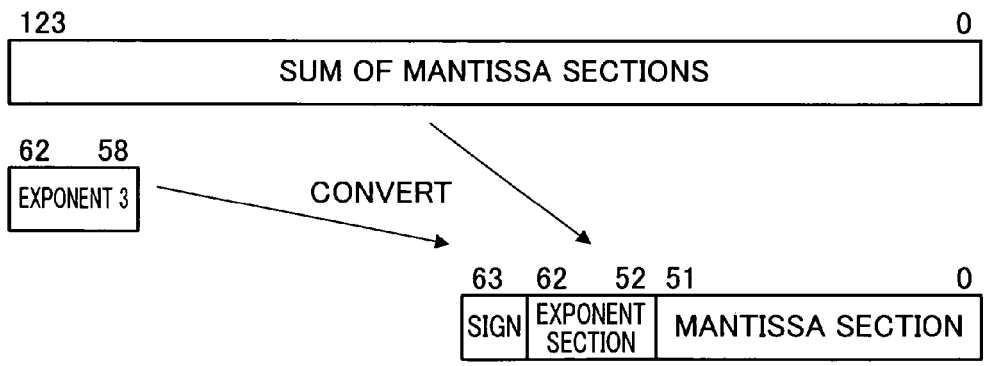
FIG. 11 is a diagram depicting the conversion processing into the floating point data in FIG. 6.
Figure 12:
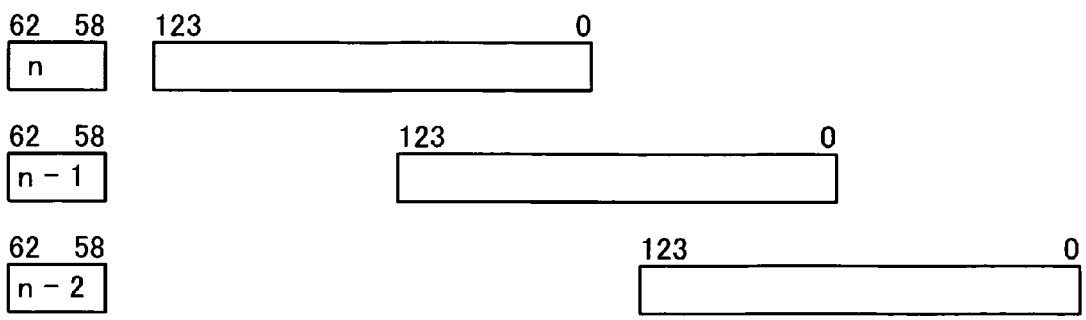
FIG. 12 is a diagram depicting the relationship between the significant bits of the exponent and absolute value of the mantissa section in FIG. 6.

FIG. 6 is a diagram depicting the first embodiment of the floating point summation processing, FIG. 7 is a diagram depicting the data conversion processing in FIG. 6, FIG. 8 is a diagram depicting the processing when a complement is determined in data conversion processing in FIG. 6, FIG. 9 shows the computing processing based on the comparison results in FIG. 5 and FIG. 6, FIG. 10 and FIG. 11 are diagrams depicting the processing for converting the computing result into floating point data, and FIG. 12 is a diagram depicting the relationship between the significant bits of the exponent section and the absolute value of the mantissa section.

As FIG. 6 shows, the nodes 10, 11, 12 and 13 directly send the floating point data to be reduced to the reduction mechanism 22 and instruct to execute summation.

The reduction mechanism 22 adds the floating point data from all the nodes in the arrival sequence, and returns the computing result to all the nodes in this addition processing. The data conversion processing described later in FIG. 7 and FIG. 8, the addition processing based on the size comparison described later in FIG. 9, and the processing of converting the computing result into floating point data, which is described later in FIG. 10 and FIG. 11, are executed in this addition process. And the nodes 10, 11, 12 and 13 receive the computing result from the reduction mechanism 22.

Now the summation processing of the reduction mechanism 22 will be described. In the following description, the 64-bit double precision floating point data shown in FIG. 19 is described as an example, but 32-bit single precision floating point data can also be processed in the same way.

As FIG. 7 shows, the data width of summation processing is determined. If the maximum number of data to be computed is 127, the number of effective digits may expand to the maximum 7 digits ($7^{th}$ power of 2=128) in the summation. So first the number of digits (52 bits in the case of double precision) of the floating point data and this number of digits (7 bits) are totaled. In other words, the total number of bit is 52+7=59 bits.

Then the number of insignificant bits to be deleted out of the exponent section is determined. A condition is that the number of digits represented by the number of bits to be deleted is greater than the above mentioned total number of digits. If the number of bits to be deleted is 5 bits, the number of digits is 31, and if 6 bits, the number of digits is 63 ($6^{th}$ power of 2=64). In the case of double precision, the total number of digits is 59, so the number of bits to be deleted, which is more than the total value, must be the insignificant 6 bits of the exponent section, to satisfy the above condition.

Therefore the required data width is 52 (mantissa section)+7 (number of digits to be increased)+63 (shift amount)+2 (other)=124 bits. The rest is 2 bits, that is the most significant bit and the sign bit, where the mantissa sections are omitted.

When the computing data width is decided, the floating point data is converted into conversion data with this data width, as shown in FIG. 7. In other words, in the case of the 124 bit width of double precision floating point data, the most significant digit of the mantissa section is complemented, and the mantissa section is shifted for the amount of the insignificant 6 bits of the exponent section, and is set in this position. And, "0" is set for sections other than the mantissa section. In the case of a floating point, the most significant digit "1" is omitted if the value is not zero, and the above complement is required.

If the sign indicates a negative number, the data is converted into a 124 bit width, and is then converted into the complement of 2, as shown in FIG. 8. This conversion of the mantissa section is executed by the data conversion section 22-2 in FIG. 5, and the significant bits of the exponent section and the converted mantissa section are set in the first register 22-3.

Now the summation processing will be described with reference to FIG. 9. In FIG. 9, the exponent 1 and mantissa 1 indicate the significant bits of the exponent section and mantissa section which are newly received, the exponent 3 and mantissa 3 indicate the highest value of the significant bits of the exponent section in the computing result and mantissa section thereof, and the mantissa 4 indicates the mantissa section corresponding to the second highest value of the significant bits of the exponent section in the computing result.

In FIG. 5, the exponent 1 and mantissa 1 are set in the first register 22-3, the exponent 3 and mantissa 3 are set in the second register 22-5, and the mantissa 4 is set in the third register 22-8. When the significant bits of the exponent section and mantissa section of the newly received floating point data are set in the first register 22-3, the comparison circuit 22-6 compares the exponent 1 and exponent 3 of the second register 22-5.

As FIG. 9 shows, if the comparison result of the comparison circuit 22-6 is exponent 1>exponent 3+1, the exponent 1 has the highest value, so the exponent 1 and mantissa 1 are set in the second register 22-5 as the new exponent 3 and new mantissa 3 via the arithmetic circuit 22-4, and "0" is set in the third register 22-8 since the exponent 3 does not have the second highest value.

If the comparison result of the comparison circuit 22-6 is exponent 1=exponent 3+1, the exponent 1 has the highest value, so the exponent 1 and mantissa 1 are set in the second register 22-5 as the new exponent 3 and new mantissa 3 via the arithmetic circuit 22-4, and the mantissa 3 of the second register 22-5 is set in the third register 22-8 since the exponent 3 has the second highest value.

If the comparison result of the comparison circuit 22-6 is exponent 1=exponent 3, the exponent 1 and exponent 3 are in a same group having the highest value, so the arithmetic circuit 22-4 is instructed to add the mantissa 1 to the mantissa 3 of the second register 22-5, then the exponent 3 and the mantissa 1+mantissa 3 are set in the second register 22-5 as the new exponent 3 and new mantissa 3, and the value (exponent 4) of the third register 22-8 is not changed.

If the comparison result of the comparison circuit 22-6 is exponent 1+1=exponent 3, the exponent 3 has the highest value, so the exponent 3 and mantissa 3 of the second register 22-5 are not changed, and since the exponent 1 has the second highest value, the arithmetic circuit 22-7 is instructed to add the mantissa 4 of the third register 22-8 and mantissa 1, and the mantissa 1+mantissa 4 is set in the third register 22-8 as the new mantissa 4.

If the comparison result of the comparison circuit 22-6 is exponent 1+1<exponent 3, the exponent 3 has the highest value, and the exponent 1 does not have the second highest value, so the exponent 3 and mantissa 3 of the second register 22-5 and the mantissa 4 of the third register 22-8 are not changed.

In this way, an exponent of which value of the significant bits of the exponent section has the highest (new exponent 3), and the computing results of mantissa section of which value of the significant bits of the exponent section is the highest (new mantissa 3), and the computing results of the mantissa section of the exponent section of which value of the significant bits has the second highest (new mantissa 4) are acquired.

Now the conversion processing from the 3 values acquired as above, that is, the new exponent 3, new mantissa 3 and new mantissa 4 into normalized floating point data will be described with reference to FIG. 10 and FIG. 11.

First, as FIG. 10 shows, the mantissa 4, which is the computing result of the mantissa section of which value of the significant bits of the exponent section is the second highest, is shifted to the right for 64 bits in order to match digits with the mantissa section of which value of the significant bits of the exponent section is the highest, and the values of bit 123 (all "0" or "1") are complemented in the significant bits. Then the digit-matched value of the mantissa 4 and value of the mantissa 3 are added to determine the sum.

Then, as FIG. 11 shows, the sum of the exponent 3, of which value of significant bits of the exponent section has the highest value, and the mantissa determined in FIG. 10, is converted into double precision floating point data. For example, from the 5 bits (bits 62–58) of an exponent section and 124 bits of a mantissa section, 1 bit of a sign, 11 bits of an exponent section and 52 bits of a mantissa section are created.

In FIG. 5, the data conversion section 22-2 acquires the values held by the second register 22-5 and the third register 22-8, and executes the above mentioned digit matching, summation and conversion.

FIG. 12 is a diagram depicting the relationship between the significant bits of an exponent and the range of the absolute value indicated by them mantissa section. First, as described above, the insignificant bits of the exponent section are deleted and reflected in the mantissa section, and the computed data is represented by the 5 bits (bits 62 to 58) of the exponent section and 124 bits of the mantissa section. This mantissa section is determined considering the maximum data count to be computed (127 in the case of FIG. 7) so that overflow does not occur when the sum of all data is determined.

As FIG. 12 shows, from a group having a same value of significant bits of an exponent and the range of the absolute value of the numeric value represented by the exponent section and the mantissa section in the result of computing the sum of each group, the least significant bit of an exponent value group (n in this case) indicates a value greater than the most significant bit of an exponent value group of which exponent value is 2 away from n (n−2 in this case).

In other words, the computing result of a group of which exponent value is smaller by a value of 2 or more has no influence on the computing result of a group of which exponent value has the highest value. This is the same as the case of adding zero, since when the digits of the mantissa sections are matched, effective digits do not exist because of the difference of the exponent sections.

And in the computation to determine the sum of groups of which exponents are the same, the mantissa section is shifted according to the insignificant bits (6 bits in this case) of the exponent section so as to increase the effective bits, so the canceling of digits of the mantissa section does not occur. Therefore in the case of computing groups of which exponent sections are the same, as shown in FIG. 9, the same computing result is acquired regardless the computing sequence.

Also as described above, the computing result of a group of which exponent value is smaller by a value of 2 or more has no influence on the computing result of a group of which the value of the exponent sections has the highest value, so the sum of only the group of which the exponent section has the highest value and the group of which the exponent section has the second highest value is computed. And the sum in the groups of which exponent sections have the highest value and the sum in the groups of which exponent sections have the second highest value are computed separately. Then digits are matched and the sum of both of the above results is computed, therefore the consistency of the computing result can be guaranteed even if the computation is performed regardless the sequence of the numeric values.

Examples using actual numeric values will be described with reference to FIG. 13, FIG. 14 and FIG. 15. This is an example when the double precision floating point format data IEEE standard is used, where the insignificant 6 bits of the exponent sections are deleted to expand the mantissa sections, and the number of the computing data is 4. The numeric values are all hexadecimal notation, and in the case of when the number of bits is less than "4", the data is shifted to the right end.

FIG. 13 shows conversion data when the insignificant 6 bits of exponent sections of data 1, 2, 3 and 4 are deleted to expand the mantissa sections. Data 1, 2, 3 and 4 are all decimal notation, and are "2.59407338536541E+18", "2.88230376151712E+18", "−2.26673591177743E+23", and "2.26677049942257E+23". "E+18" indicates the 18$^{th}$ power of 10.

As FIG. 13 shows, the data 1 before conversion is exponent=44C and mantissa=8 0018 0000 0000 and sign +. In "during processing 1", the omitted most significant digit "1" is complemented and the mantissa section is expanded to 124 bits. Then the mantissa section of 124 bits is shifted 12 bits to the left because of the insignificant 6 bits (=0C) of the exponent section. The exponent section stores the significant 5 bits. The exponent value of the 5 bits indicates the exponent group.

Data 2 is also the same, and since the sign indicates a negative number, the complement computing of the conversion data is added. In the same way, the conversion data of data 3 and 4 are acquired.

Then the data 1, 2, 3 and 4 are computed for each exponent value group respectively. As FIG. 13 shows, data 1 and data 2 are in a same exponent value group, and data 3 and data 4 are in another same exponent value group. As FIG. 14 shows, the mantissa 3 (see FIG. 9) of the exponent value group (exponent=11) is acquired by adding the mantissa section of the data 1 and mantissa section of the data 2.

In the same way, the mantissa section of the data 3 and mantissa section of the data 4 are added, and the mantissa 4 (see FIG. 9) of the exponent value group (exponent=10) is acquired. Since the difference of the exponent section of the mantissa 4 is 64 (=6 bits), compared to mantissa 3, the mantissa 4 is shifted 64 bits to the right so as to match the exponent sections according to the principle in FIG. 10. And the shifted value is added to the mantissa 3 so as to determine the final computing result.

The final computing result is converted into double precision floating point format as shown in FIG. 15. In "during conversion 1", the exponent group is indicated by the significant 5 bits, so zero is complemented in the insignificant 6 bits which are omitted. Then in "during conversion 2", the number of effective digits of the mantissa section of double precision floating point is 53 bits, so the mantissa section is converted into 53 bit mantissa section. This conversion is performed such that the left end of the 53 bits of the mantissa section becomes "1". In FIG. 15, the value when the insignificant 53 bits are shifted 3 bits to the left becomes the mantissa section, and the exponent section is changed to a value when 3 is subtracted (i.e., −3), since the data was shifted 3 bits to the left. For the sign after conversion, the value at the left end of 124 bits of mantissa section becomes the sign bit.

In "during conversion 3", 1 bit at the left end of the 53 bits of the mantissa section is omitted, so 52 bits are used for the floating point format. After conversion, double precision floating point format data comprised of 1 bit of a sign bit, 11 bits of an exponent section and 52 bits of a mantissa section, is acquired.

Second Embodiment of Floating Point Summation Process

Figure 16:
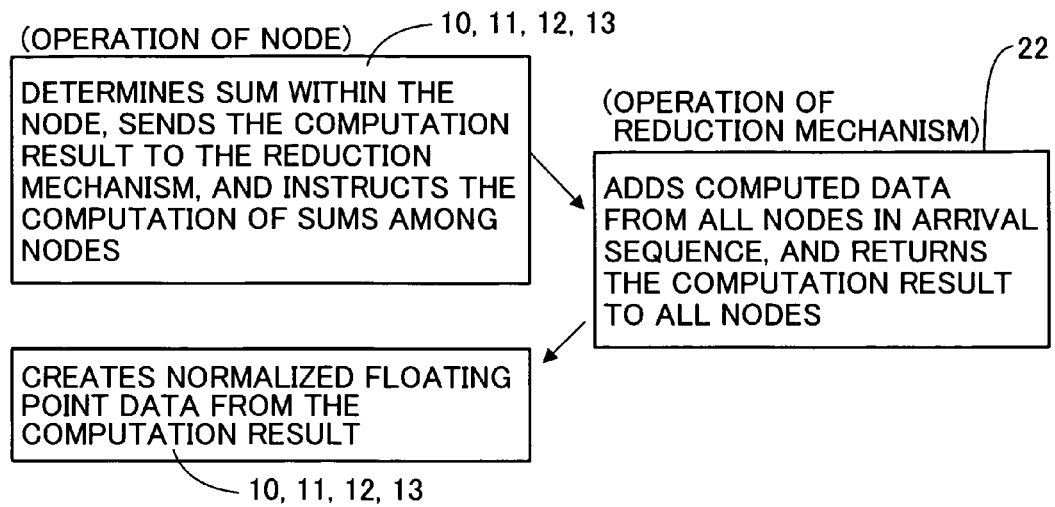
FIG. 16 is a diagram depicting the summation processing of the floating point data according to the second embodiment of the present invention.
Figure 17:
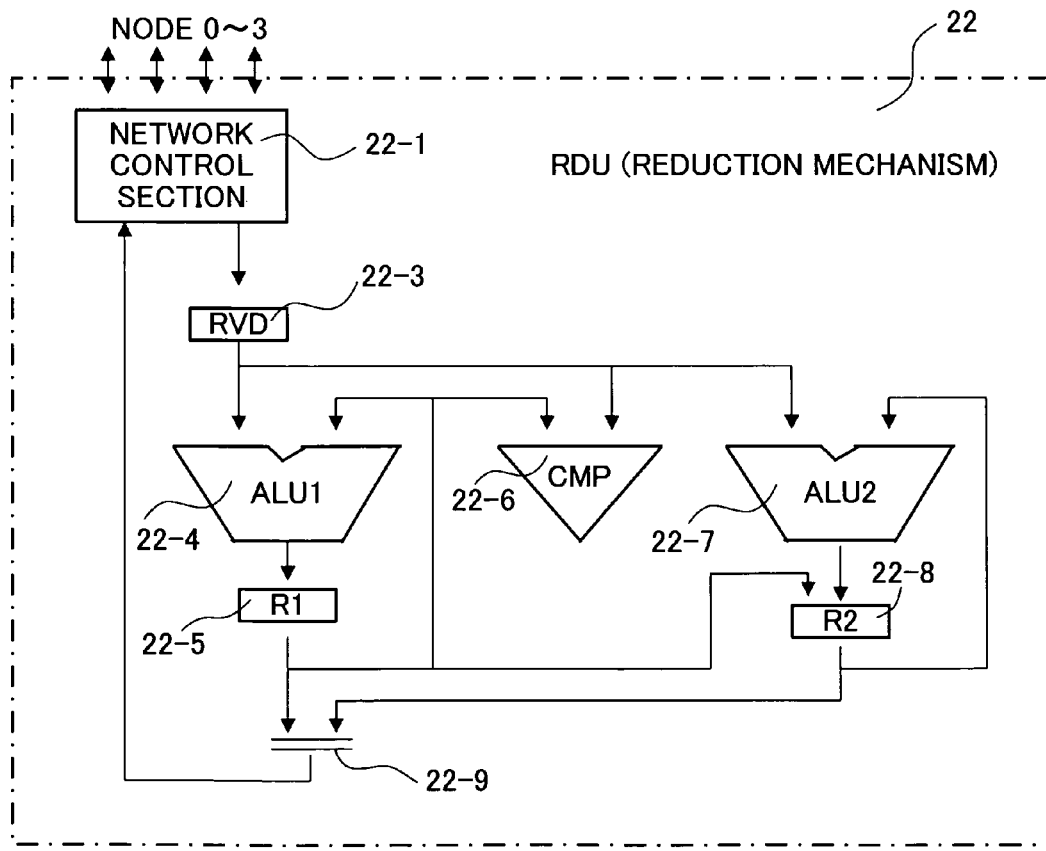
FIG. 17 is a block diagram depicting the reduction mechanism in FIG. 16.

FIG. 16 is a diagram depicting the floating point summation processing according to the second embodiment of the present invention, FIG. 17 is a block diagram depicting the reduction mechanism thereof, and FIG. 18 shows the relationship between the comparison result and the computing processing in FIG. 17. This embodiment is an example when a plurality of CPUs 40 exists in the node, and after the floating point summation is executed within the node, and then floating point summation of all the nodes is executed by the reduction mechanism 22.

As FIG. 16 shows, each node 10, 11, 12 and 13 calculates the sum for each exponent value group by the processing in FIG. 7 to FIG. 9, for the floating point data summation of a plurality of CPUs. Each node sends the calculated exponent section and mantissa section to the reduction mechanism 22, and instructs to compute the sums among the nodes.

As FIG. 17 shows, the reduction mechanism 22 does not have the data conversion section 22-2, unlike the configuration in FIG. 5. In other words, a conversion operation is unnecessary since the converted exponent section and mantissa section are sent. The reduction mechanism 22 adds the data of the exponent section and mantissa section from all the nodes in the arrival sequence, and returns the computing result to all the nodes. In this addition processing, addition processing based on size comparison, which is described later in FIG. 18, is executed. The nodes 10, 11, 12 and 13 receive the computing result from the reduction mechanism 22, and create the normalized floating point data shown in FIG. 10 and FIG. 11.

Now the summation processing in the addition process of the reduction mechanism 22 will be described with reference to FIG. 18. In FIG. 18, just like FIG. 9, the exponent 1 and mantissa 1 indicate the newly received significant bits of the exponent section and mantissa section, and the mantissa 2 indicates the mantissa section corresponding to the newly received data of which significant bits of the exponent section have the second highest value, and the exponent 3 and mantissa 3 indicates the highest value of the significant bits of the exponent section and the mantissa thereof in the computing result, and the mantissa 4 indicates the mantissa section corresponding to the exponent section of which significant bits have the second highest value in the computing result.

In FIG. 17, the exponent 1, mantissa 1 and mantissa 2 are set in the first register 22-3, the exponent 3 and mantissa 3 are set in the second register 22-5, and the mantissa 4 is set in the third register 22-8. When the significant bits of the exponent section and mantissa section of the newly received floating point data are set in the first register 22-3, the comparison circuit 22-6 compares the exponent 1 and exponent 3 in the second register 22-5.

As FIG. 18 shows, if the comparison result of the comparison circuit 22-6 is exponent 1>exponent 3+1, the exponent 1 has the highest value, so the exponent 1 and mantissa 1 are set in the second register 22-5 as the new exponent 3 and new mantissa 3, and the mantissa 2 is set in the third register 22-8 via the arithmetic circuit 22-4.

If the comparison result of the comparison circuit 22-6 is the exponent 1=exponent 3+1, the exponent 1 has the highest value, so the exponent 1 and mantissa 1 are set in the second register 22-5 as the new exponent 3 and new mantissa 3 via the arithmetic circuit 22-4, and since the exponent 3 has the second highest value, the mantissa 2+mantissa 3 is computed by the arithmetic circuit 22-7 and the mantissa 2+mantissa 3 is set in the third register 22-8.

If the comparison result of the comparison circuit 22-6 is exponent 1=exponent 3, the exponent 1 and exponent 3 are in a same highest value group, so the arithmetic circuit 22-4 is instructed to add the mantissa 1 to the mantissa 3 in the second register 22-5, the exponent 3 and mantissa 1+mantissa 3 are set in the second register 22-5 as the new exponent 3 and new mantissa 3, and the mantissa 2+mantissa 4 is computed by the arithmetic circuit 22-7, and the mantissa 2+mantissa 4 is set in the third register 22-8.

If the comparison result of the comparison circuit 22-6 is exponent 1+1=exponent 3, the exponent 3 has the highest value, so the exponent 3 and mantissa 3 in the second register 22-5 are not changed, and the arithmetic circuit 22-4 is instructed to add the mantissa 4 and mantissa 1 in the third register 22-8, since the exponent 1 has the second highest value, and the mantissa 1+mantissa 4 is set in the third register 22-8 as the new mantissa 4.

If the comparison result of the comparison circuit 22-6 is exponent 1+1<exponent 3, the exponent 3 has the highest value and the exponent 1 does not have the second highest value, so the exponent 3 and mantissa 3 in the second register 22-5 and the mantissa 4 in the third register 22-8 are not changed.

In this way, the exponent of which value of the significant bits of the exponent section has the highest value (new exponent 3), the computing result of the mantissa section of which the value of significant bits of the exponent section have the highest value (new mantissa 3), and the computing result of the mantissa sections of which the value of significant bits of the exponent section have the second highest value (new mantissa 4) are acquired.

Finally three data, that is, the exponent 3, mantissa 3 and mantissa 4 are returned to all the nodes. All the nodes create normalized floating point data from the received exponent 3, mantissa 3 and mantissa 4.

In this way, floating point summation within the node is performed by the node, and floating point summation among nodes is performed by the reduction mechanism.

Other Embodiments

In the above embodiments, 64-bit double precision floating point data was used for description, but the present invention can also be applied to 32-bit single precision floating point data. In this case, the increased number of digits depends on the maximum number of data, so it is still 7 bits, but the number of bits to be deleted is only 5 bits, so the data width is 23 (mantissa section)+7+31+2=63 bits.

Also a parallel computer with 4 nodes was described, but the present invention can be applied to a parallel computer with 2 or more nodes. For the configuration of a node, a computer unit having a CPU, memory, etc. was described, but other computer configurations may be used. The format of the transmission line is not limited to ETHERNET®, but may be other network protocols.

Since the computing result of a group of which exponent value is smaller by the value of 2 or more has no influence on the computing result of a group of which exponent section has the highest value, the sum of only the group of which exponent section has the highest value and the sum of the group of which exponent section has the second highest value are computed, and the sum of the group of which exponent section has the highest value and the sum of the group of which exponent section has the second highest value, are added, therefore the consistency of the computing result can be guaranteed even if computation is performed regardless the computing sequence of numeric values.

What is claimed is:
1. A summation processing method for floating point data for computing a sum of three or more floating point data in arrival sequence by a reduction mechanism, comprising:
  establishing storage locations for first and second floating point data groups having mantissa and exponent sec- tions, the exponent sections of the first and second floating point data groups having significant bits with a highest value and a second highest value, respectively;

shifting, by a data conversion circuit, a mantissa of received floating point data according to values of insignificant bits of an exponent section of the received floating point data, to create a mantissa section of the received floating point data with an expanded data width;

inputting the mantissa section with the expanded data width to a comparison circuit and to a first arithmetic circuit and a second arithmetic circuit;

comparing, by the comparison circuit, the significant bits of the exponent section of the received floating point data with the significant bits of the exponent sections of the first and second floating point data groups;

setting, by the comparison circuit, the stored exponent sections of the first and second floating point data groups according to the comparison result of said comparison circuit;

dynamically computing, by the first arithmetic circuit, a first sum of the mantissa sections of the first floating point data group and the mantissa section of the received floating point data when the received floating point data belongs to the first floating point data group according to a comparison result of said comparison circuit;

dynamically computing, by the second arithmetic circuit, a second sum of the mantissa sections of the second floating point data group and the mantissa section of the received floating point data when the received floating point data belongs to the second floating point data group according to a comparison result of said comparison circuit;

shifting, by said data conversion circuit, the second sum according to the values of the insignificant bits of the exponent sections of the second floating point data group after all floating point data has arrived, to produce a shifted sum; and adding, by the processor said data conversion circuit, the first sum of the mantissa sections of the first floating point data group and the shifted sum of the mantissa sections of the second floating point data group by a data conversion circuit.

2. The summation processing method for floating point data according to claim 1, further comprising creating the floating point data from the addition result of the mantissa sections and significant bits of the exponent section by said conversion circuit after all floating point data has arrived.

3. The summation processing method according to claim 1, wherein the setting of the stored exponent sections of the first and second floating point data groups further comprising setting, the values of the exponent sections of the received floating point data to the first floating point data group and the first floating data group to the second floating data group when the value of the exponent sections of the received floating point data is over the highest value of the first floating data group.

4. A computer system, comprising:
a plurality of nodes each having at least one processor; and
a reduction mechanism for receiving floating point data from each node and computing a sum of floating point data of each of the nodes in arrival sequence from each of the nodes, the reduction mechanism including:
a storage for first and second floating point data groups having mantissa and exponent sections, the exponent sections of the first and second floating point data groups having significant bits with a highest value and a second highest value, respectively;
a data conversion circuit which shifts the mantissa of the received floating point data, according to the values of insignificant bits of the exponent section of the received floating point data, to create a mantissa section with an expanded data width, and inputs the mantissa section with the expanded data width to a comparison circuit and to a first arithmetic circuit and a second arithmetic circuit;
said comparison circuit which compares the significant bits of an exponent section of received floating point data with the significant bits of the exponent sections of the first and second floating point data groups, and which sets the stored exponent sections of the first and second floating point data groups according to the comparison result of said comparison circuit;
said first arithmetic circuit which dynamically computes a first sum of the mantissa sections of the first floating point data group and the mantissa section of the received floating point data when the received floating point data belongs to the first floating point data group according to a comparison result of said comparison circuit;
said second arithmetic circuit which dynamically computes a second sum of the mantissa sections of the second floating point data group and the mantissa section of the received floating point data when the received floating point data belongs to the second floating point data group according to the comparison result of said comparison circuit;
wherein said data conversion circuit produces a shifted sum by shifting the second sum according to values of the insignificant bits of the exponent sections of the second floating point data group after all floating point data has arrived, and adds the first sum of the mantissa sections of the first floating point data group and the shifted sum of the mantissa sections of the second floating point data group.

5. The computer system according to claim 4, wherein said data conversion circuit creates the floating point data from the addition result of the mantissa sections and significant bits of the exponent section after all floating point data has arrived.

6. The computer system according to claim 4,
the storage for the first and second exponent sections of the first and second floating point data further comprising first and second registers storing the highest and second highest values of the significant bits of the exponent sections of the first and second floating point data, respectively, and
wherein the setting of the first and second stored exponent sections comprises transferring the contents of the first register to the second register and assigning the first register the significant bits of the exponent section of the received floating point data when the significant bits of the exponent section of the received floating point data is larger than the highest value of the first floating data group.

7. A computer system comprising:
a plurality of nodes having at least one processor; and
a reduction mechanism for computing a sum of the floating point data of each of the nodes in arrival sequence from each of the nodes,
wherein each of the nodes shifts a mantissa of the floating point data according to values of insignificant bits of an exponent section of the floating point data, to create a mantissa section with an expanded data width, compares significant bits of the exponent sections of the floating point data with first and second floating point data groups having exponent sections with significant bits that have a highest value and a second highest value, respectively, computes a first sum of mantissa sections of the first floating point data group according to the comparison result, and a second sum of the mantissa sections of the second floating point data group, and sends the first and second sums as computation results to the reduction mechanism, and wherein the reduction mechanism computes a third sum of the mantissa sections of a third floating point data group of which the exponent sections have the highest value, and a fourth sum of the mantissa sections of a fourth floating point data group of which the exponent sections have the second highest value from the computation results of a plurality of nodes in arrival sequence, and returns the third and fourth sums to each node after all computation results have arrived from each of the nodes, the reduction mechanism including:

a storage for third and fourth floating point data groups having mantissa and exponent sections, the exponent sections of the third and fourth floating point data groups having significant bits with a highest value and a second highest value, respectively;

a storage for a received computation result exponent and mantissa sections, which inputs the mantissa section to a comparison circuit and to a first arithmetic circuit and a second arithmetic circuit;

said comparison circuit which compares the significant bits of an exponent section of received floating point data with the significant bits of the exponent sections of the third and fourth floating point data groups, and which sets the stored exponent section of the third and fourth floating point data groups according to the comparison result of said comparison circuit;

said first arithmetic circuit which dynamically computes a first sum of the mantissa sections of the third floating point data group and the mantissa section of the received floating point data when the received floating point data belongs to the third floating point data group according to a comparison result of said comparison circuit;

said second arithmetic circuit which dynamically computes a second sum of the mantissa sections of the fourth floating point data group and the mantissa section of the received floating point data when the received floating point data belongs to the fourth floating point data group according to the comparison result of said comparison circuit; and wherein each of the nodes adds the third and fourth sums returned from the reduction mechanism.

8. The computer system according to claim 7, wherein each of the nodes shifts the second sum and the sum according to digit-matching of the exponent sections and adds a result thereof.

9. The computer system according to claim 7, wherein each of the nodes creates the floating point data from an addition result of the mantissa sections and the significant bits of the exponent sections.

10. A computer system comprising:
a plurality of nodes having at least one processor; and
a reduction mechanism for computing a sum of floating point data of each of the nodes in arrival sequence from each of the nodes, wherein each of the nodes shifts a mantissa of the floating point data according to values of insignificant bits of an exponent section of the floating point data, to create a mantissa section with an expanded data width, compares significant bits of the exponent sections of the floating point data with first and second floating point data groups having exponent sections with significant bits that have a highest value and a second highest value, respectively, computes a first sum of mantissa sections of the first floating point data group according to the comparison result, and a second sum of mantissa sections of the second floating point data group, and sends the first and second sums as computation results to the reduction mechanism, and wherein the reduction mechanism computes a third sum of the mantissa sections of a third floating point data group of which the exponent sections have a highest value, and a fourth sum of the mantissa sections of a fourth floating point data group of which the exponent sections have a second highest value from the computation results of a plurality of nodes in arrival sequence, and adds the third and fourth sums after all computation results have arrived from each of the nodes, the reduction mechanism including:

a storage for third and fourth floating point data groups having mantissa and exponent sections, the exponent sections of the third and fourth floating point data groups having significant bits with a highest value and a second highest value, respectively;

a storage for a received computation result exponent and mantissa sections, which inputs the mantissa section to a comparison circuit and to a first arithmetic circuit and a second arithmetic circuit;

said comparison circuit which compares the significant bits of an exponent section of received floating point data with the significant bits of the exponent sections of the third and fourth floating point data groups, and which sets the stored exponent section of the third and fourth floating point data groups according to the comparison result of said comparison circuit;

said first arithmetic circuit which dynamically computes a first sum of the mantissa sections of the third floating point data group and the mantissa section of the received floating point data when the received floating point data belongs to the third floating point data group according to a comparison result of said comparison circuit;

said second arithmetic circuit which dynamically computes a second sum of the mantissa sections of the fourth floating point data group and the mantissa section of the received floating point data when the received floating point data belongs to the fourth floating point data group according to the comparison result of said comparison circuit;

a data conversion circuit which produces a shifted sum by shifting the second sum according to values of the insignificant bits of the exponent sections of the fourth floating point data group after all floating point data has arrived, and adds the first sum of the mantissa sections of the third floating point data group and the shifted sum of the mantissa sections of the fourth floating point data group.

* * * * *

UNITED STATES PATENT AND TRADEMARK OFFICE
CERTIFICATE OF CORRECTION

| | |
|---|---|
| PATENT NO. | : 7,873,688 B2 |
| APPLICATION NO. | : 11/475048 |
| DATED | : January 18, 2011 |
| INVENTOR(S) | : Junichi Inagaki et al. |

It is certified that error appears in the above-identified patent and that said Letters Patent is hereby corrected as shown below:

Column 13, Line 53 in Claim 3, delete "setting," and insert -- setting --, therefor.

Signed and Sealed this
Nineteenth Day of April, 2011

David J. Kappos
*Director of the United States Patent and Trademark Office*